(12) United States Patent  
Barzen

(10) Patent No.: US 7,775,597 B2
(45) Date of Patent: Aug. 17, 2010

(54) FOLDING SEATS

(75) Inventor: Alexander Barzen, Ettlingen (DE)

(73) Assignee: Agco GmbH, Marktoberdorf (DE)

( * ) Notice: Subject to any disclaimer, the term of this patent is extended or adjusted under 35 U.S.C. 154(b) by 0 days.

(21) Appl. No.: 12/234,412

(22) Filed: Sep. 19, 2008

(65) Prior Publication Data
US 2009/0102249 A1 Apr. 23, 2009

(30) Foreign Application Priority Data
Oct. 23, 2007 (GB) ................ 0720795.4

(51) Int. Cl.
B60N 2/20 (2006.01)
B60N 2/02 (2006.01)
A47B 85/04 (2006.01)
(52) U.S. Cl. ............. 297/378.1; 297/332; 297/119
(58) Field of Classification Search .............. 297/94, 297/283.1, 283.2, 283.3, 378.1, 332, 331, 297/119, 16.1
See application file for complete search history.

(56) References Cited
U.S. PATENT DOCUMENTS
3,743,350 A * 7/1973 Allen ........................ 297/94
4,779,917 A * 10/1988 Campbell et al. ......... 296/65.09
4,779,926 A * 10/1988 Maruyama ................. 297/324
4,902,070 A * 2/1990 Casale et al. .............. 297/238
4,955,973 A * 9/1990 Provencher .............. 296/65.07
5,320,411 A * 6/1994 Sera ......................... 297/335
5,730,495 A * 3/1998 Tuman, II ................. 297/331
7,419,217 B2 * 9/2008 Ishizuka ................. 297/378.12

* cited by examiner

Primary Examiner—Milton Nelson, Jr.

(57) ABSTRACT

A folding seat has a support structure, a backrest and a seat base. The seat base is pivotally mounted on the support structure for pivoting between a seating position with the seat base extending generally horizontally and the backrest generally vertically, a stored position with the base and backrest both extending generally vertically, and a table position with base and backrest both extending generally horizontally. A first over-centre spring biases the seat base towards its generally horizontal position or its generally vertical position depending on the location of the base. Also, a second over-centre spring biases the backrest towards its generally vertical position or its generally horizontal position depending on the location of the backrest.

8 Claims, 9 Drawing Sheets

FOLDING SEATS

CROSS-REFERENCE TO RELATED APPLICATION

The present application claims the benefit of and priority from Great Britain Application No. GB 0720795.4, filed Oct. 23, 2007, the entire disclosure of which is hereby incorporated by reference herein.

BACKGROUND OF THE INVENTION

Field of the Invention

This invention relates to folding seats and in particular to such seats for use as passenger seats in agricultural tractors or similar vehicles.

SUMMARY

There is a requirement for such seats in which the components of the seat can easily be moved between and held in their various positions.

Thus according to the present invention there is provided a folding seat having a support structure and a backrest and seat base pivotally mounted on the support structure for pivoting between a seating position with the seat base extending generally horizontal and the backrest generally vertically, a stored position with the base and backrest both extending generally vertical, and a table position with base and backrest both extending generally horizontally, first over-centre spring means acting on the seat base to bias the seat base towards its generally horizontal position or its generally vertical position depending on which side of the first spring means over-centre position the base is located, and second over-centre spring means acting on the backrest to bias the backrest towards its generally vertical position or its generally horizontal position depending on which side of the second spring means over-centre position the backrest is located.

The over-centre spring means not only tend to hold the backrest and seat base in their generally vertical and horizontal positions but also provide assistance for moving the backrest and seat base between these positions as they move through the over-centre positions of the spring means. This reduces any tendency of the backrest and seat base to rattle and avoids any need to have any locking means to physically lock the backrest or seat base in either the vertical or horizontal position. Also one handed movement of the backrest and seat base is possible.

In a preferred construction the first over-centre spring means acts between the seat base and the support structure and the second over-centre spring means acts between the seat base and the backrest.

This construction means that the backrest and seat base can be swung, under the action of the first over-centre spring means, between the vertical stored position and the horizontal table position whilst held together as a pair by the second over-centre spring means.

In an alternative construction the first over-centre spring means acts between the seat base and the support structure and the second over-centre spring means acts between the seat base and the support structure.

The over-centre spring means may each comprise a gas spring or a coil or compression spring.

Preferably first stop means are provided to limit the movements of the seat base and backrest away from each other to define the position of the backrest when in the seating position. This arrangement ensures that the first over-centre spring means is not continually stressed by being required to maintain the backrest at the required angle for the seating position.

Second stop means are also preferably provided to limit the movement of the seat base and backrest towards each other. The second stop means prevents the backrest and seat base from damaging each other when they are adjacent each other in the stored or table positions.

The seat base may be provided with a first pair of mounting brackets located one at each side of the seat base which pivotally mount the seat base on the support structure and the backrest has a second pair of mounting brackets located one on each side of the backrest which pivotally mount the back rest on the support structure.

In such an arrangement the second over-centre centre spring means may act between one of the second pair of brackets and the seat base.

BRIEF DESCRIPTION OF THE DRAWING FIGURES

One embodiment of the present invention will now be described, by way of example only, with reference to the accompanying drawings in which.

Figure 1:
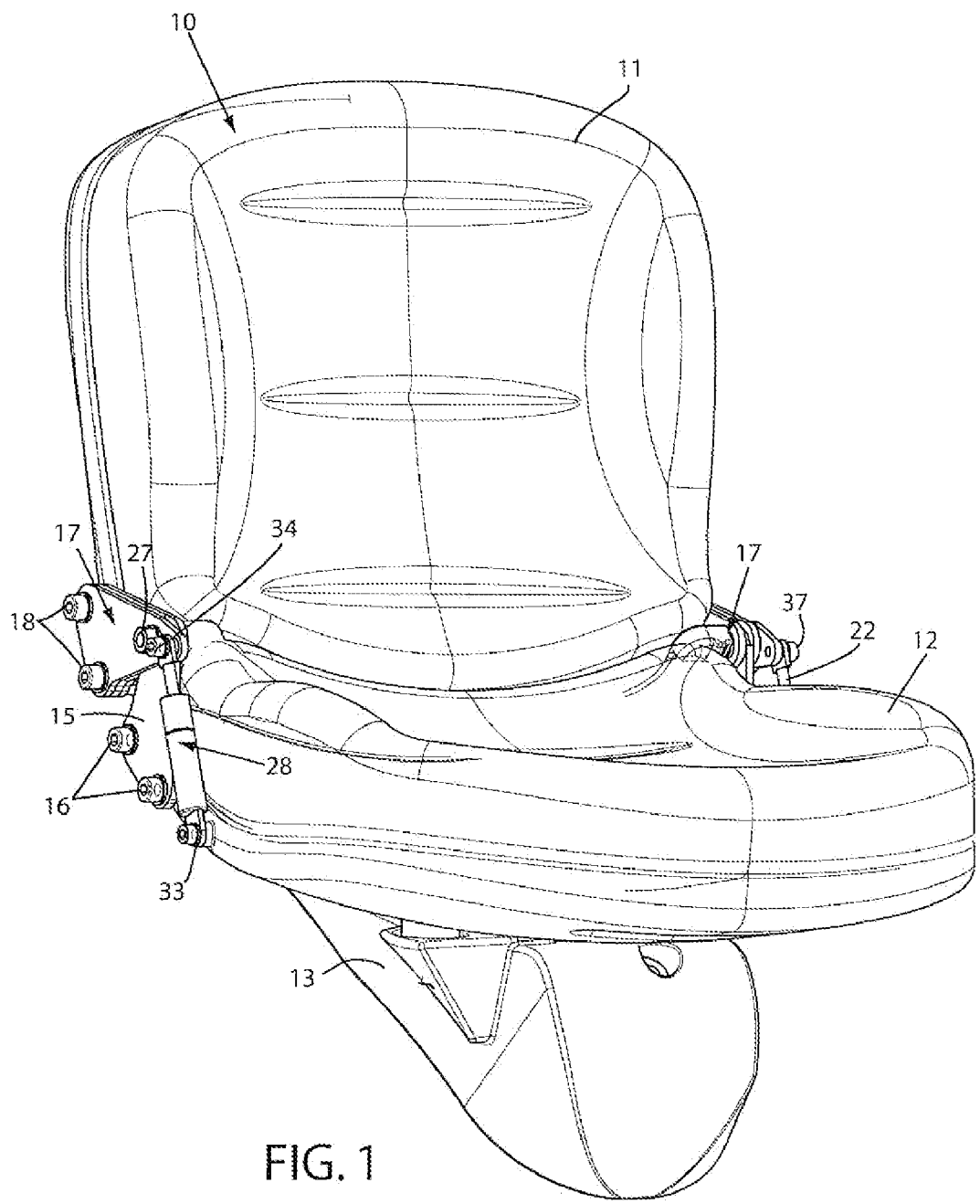
FIG. 1 shows a front perspective view of a folding tractor passenger seat in accordance with the present invention in its seating position.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENT

Referring to the drawings a folding tractor passenger seat 10 has a backrest 11 and seat base 12 which are both pivotally mounted on a support structure 13. The support structure includes a pair of support arms 14 whose outer ends 14*a* each support an outwardly projecting pivot pin 14*b* on which both the backrest 11 and seat base 12 are mounted for pivoting about an axis Z (see FIG. 2). The support structure 13 is typically mounted inside a tractor cab on an inner wall of a tractor rear wheel arch/fender to one side of the tractor driver's seat.

Figure 10:
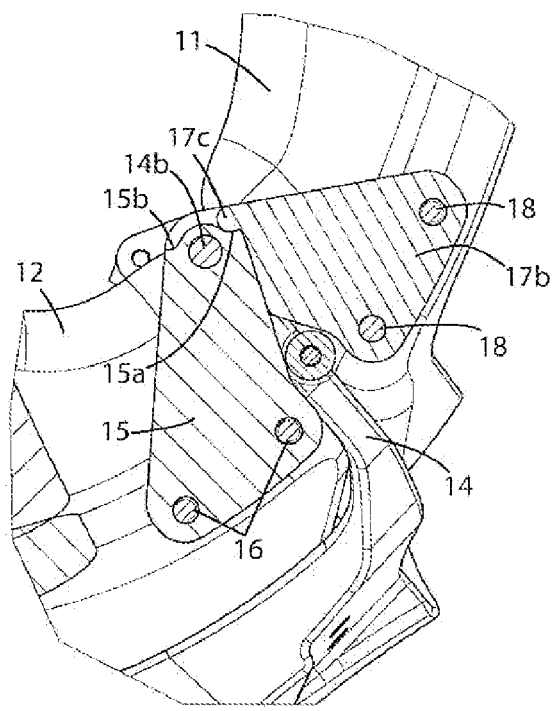
FIGS. 10 and 11 show sections on plane A-A of FIG. 8 and plane B-B of FIG. 9 respectively.

The seat base 12 is provided with a pair of mounting brackets 15 located one on each side of the seat base and which are secured to the seat base by bolts 16. Similarly, a three-piece mounting bracket 17 is provide at each side of the backrest 11 and is secured to the backrest by mounting bolts 18. The three-piece brackets 17 each comprise outer components 17a and an inner spacing component 17b (best seen in FIGS. 10 and 11). Component 17b has a stop nose 17c which, as shown in FIG. 10, cooperates with a stop surface 15a on each respective bracket 15 to limit the pivotal movement of the backrest 11 away from the seat base 12. Similarly, the stop nose 17c cooperates with a further stop surface 15b on each respective bracket 15 to limit the movement towards each other of the backrest 11 and seat base 12.

A first over-centre spring means 19 acts between the seat base 12 and the support structure 14. In the example shown this over-centre spring means is a gas strut which has an outer cylinder 20 within which a piston 21 attached to a piston rod 22 (see FIG. 5) is biased by gas retained under pressure in a chamber 23 of the gas strut. This gas pressure tends to try to extend the effective length of the gas strut at all times. The outer cylinder 20 of the gas strut is pivoted to the seat base by bolt 24 and the end of the piston rod 22 is pivoted to the support structure 14 by a bolt 37 via a mounting plate 25 which is bolted to the support structure 14 by a bolt 26 and is received on the pivot pin 14b where it is held captive by a nut 27.

Figure 4:
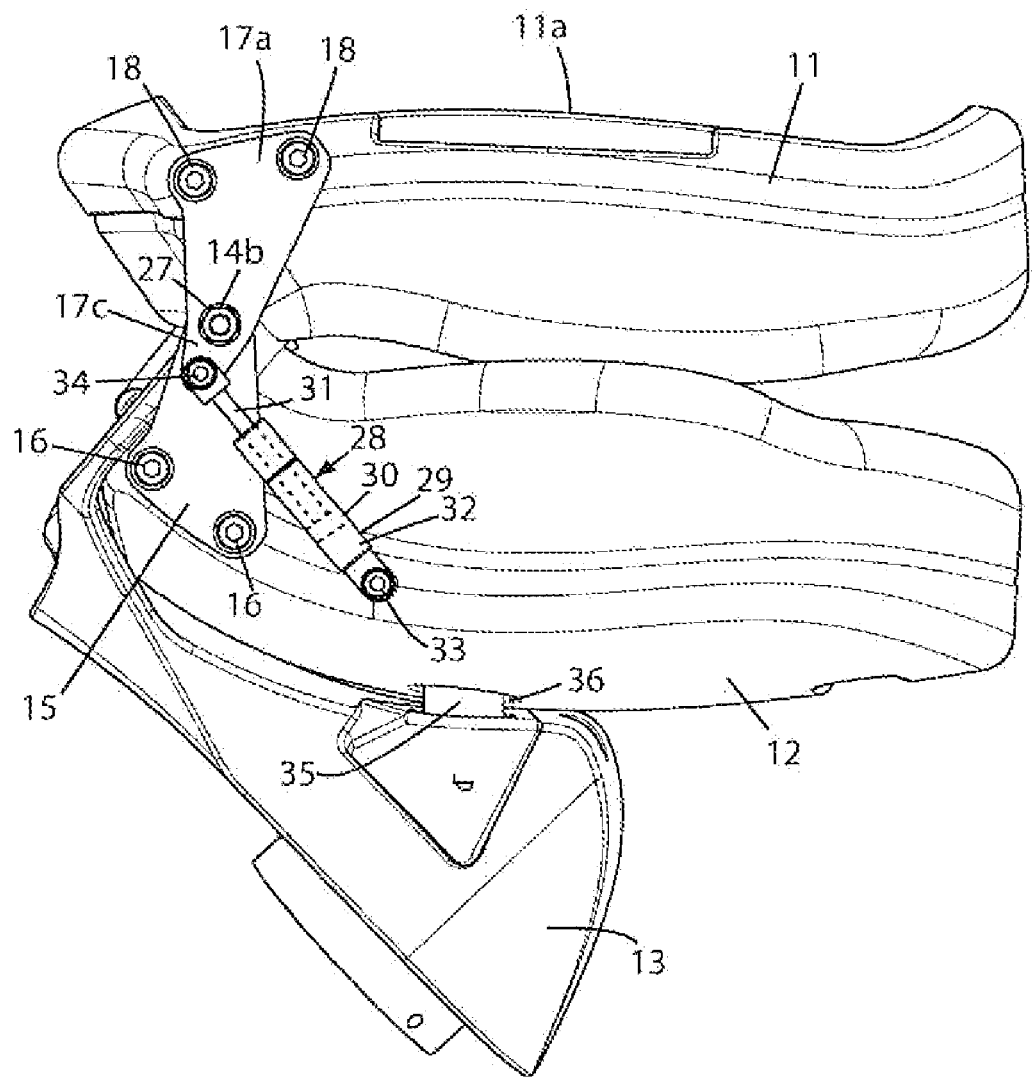
FIG. 4 shows a side view of the seat in its table position.

On the other side of the seat a second over-centre spring means 28 is provided which, in the example shown, is also of the gas strut type having an outer cylinder 29 within which a piston 30 having a piston rod 31 slides (see FIG. 4). Again the gas strut 28 contains pressurized gas in the chamber 32 which constantly tends to increase the effect length of the gas strut. The outer cylinder 29 of the gas strut is pivoted on the seat base by bolt 33 and the piston rod 31 is pivoted on an extension 17c of the bracket member 17a by a bolt 34.

The support structure 13 is provided with two projections 35 which, when the seat base is in a lower horizontal position enter apertures 36 in the seat base to help locate the seat against sideways movement.

Figure 5:
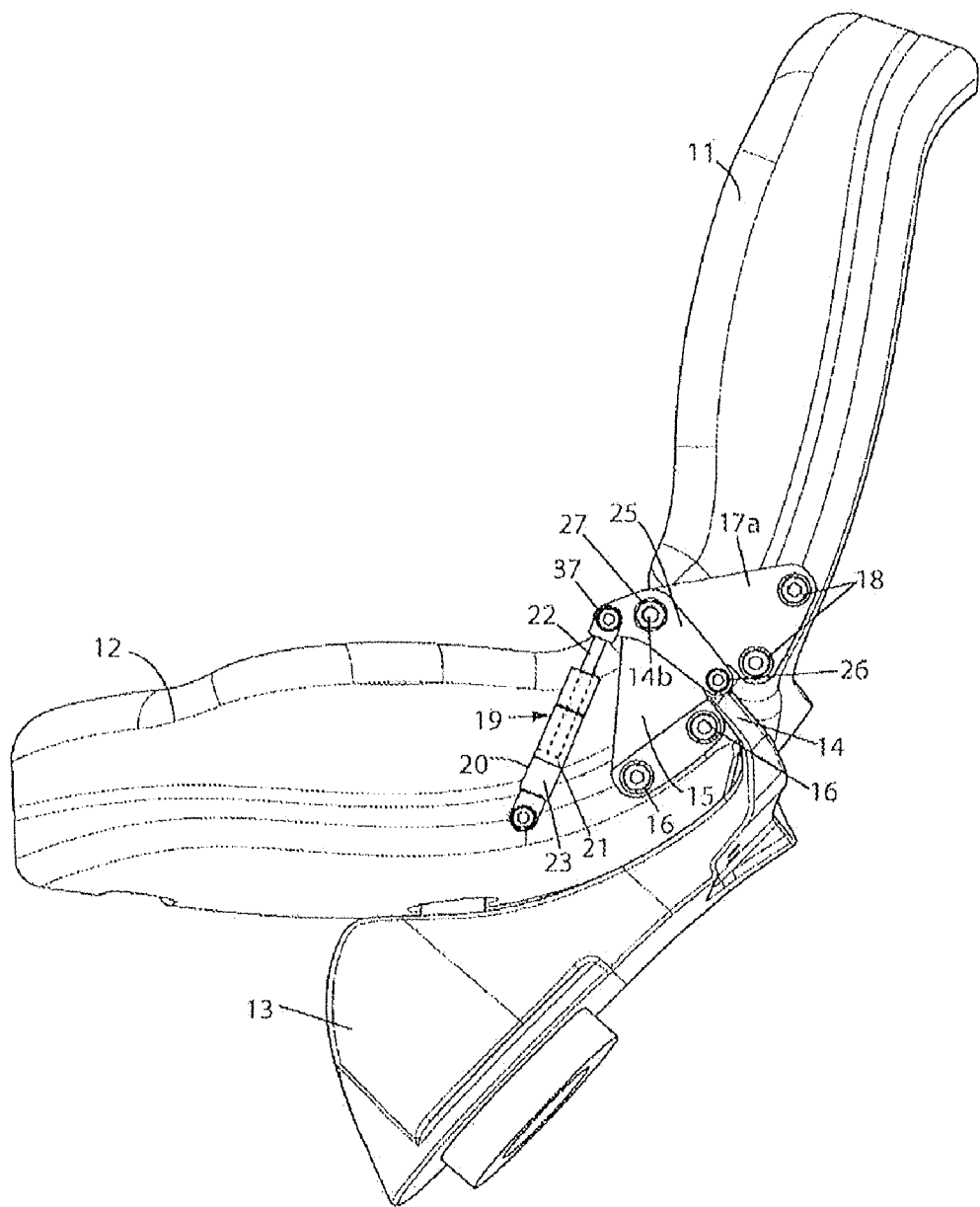
FIG. 5 shows a side view of the seat in its seating position.
Figure 6:
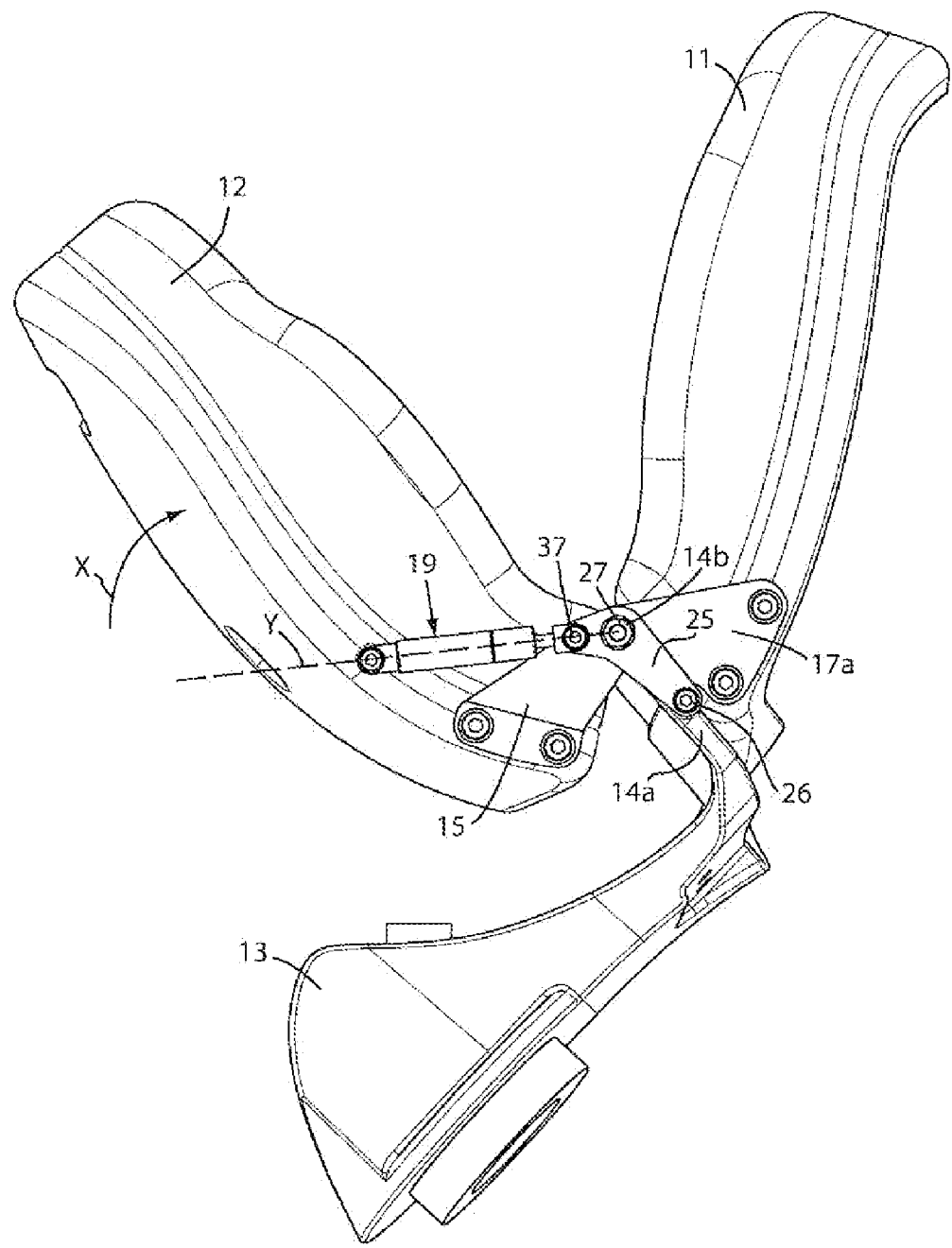
FIG. 6 shows a side view of the seat base moving between its seating and stored positions.

With the seat in the sitting position shown in FIGS. 1 and 5 the seat base 12 can be pivoted vertically about the pivot pins 14b by applying a force to the seat base in the direction of the arrow X over FIG. 6. When the seat base reaches the FIG. 6 position the line of action of the gas strut 19 passes through the pivot pin 14b as shown by the line Y and this is the so-called over-centre position. For positions of the seat base 12 below the line of action Y the force applied to the seat base by the gas strut 19 tends to oppose the upward movement of the seat base whereas for positions of the seat base above the FIG. 6 position the gas strut 19 assists the tractor driver to move the seat base 12 to the stored position shown in FIG. 3. When the seat base 12 is in the FIG. 3 position the gas strut 19 holds the seat base 12 in its stored position.

When the seat base 12 is pivoted away from the backrest to move towards the sitting position the gas strut 19 initially helps to support the seat base 12 as it is moved downwardly thus stopping the seat base falling immediately to the seating position. When the seat base is in the seating position the gas strut 19 holds the seat base firmly in this position.

Figure 2:
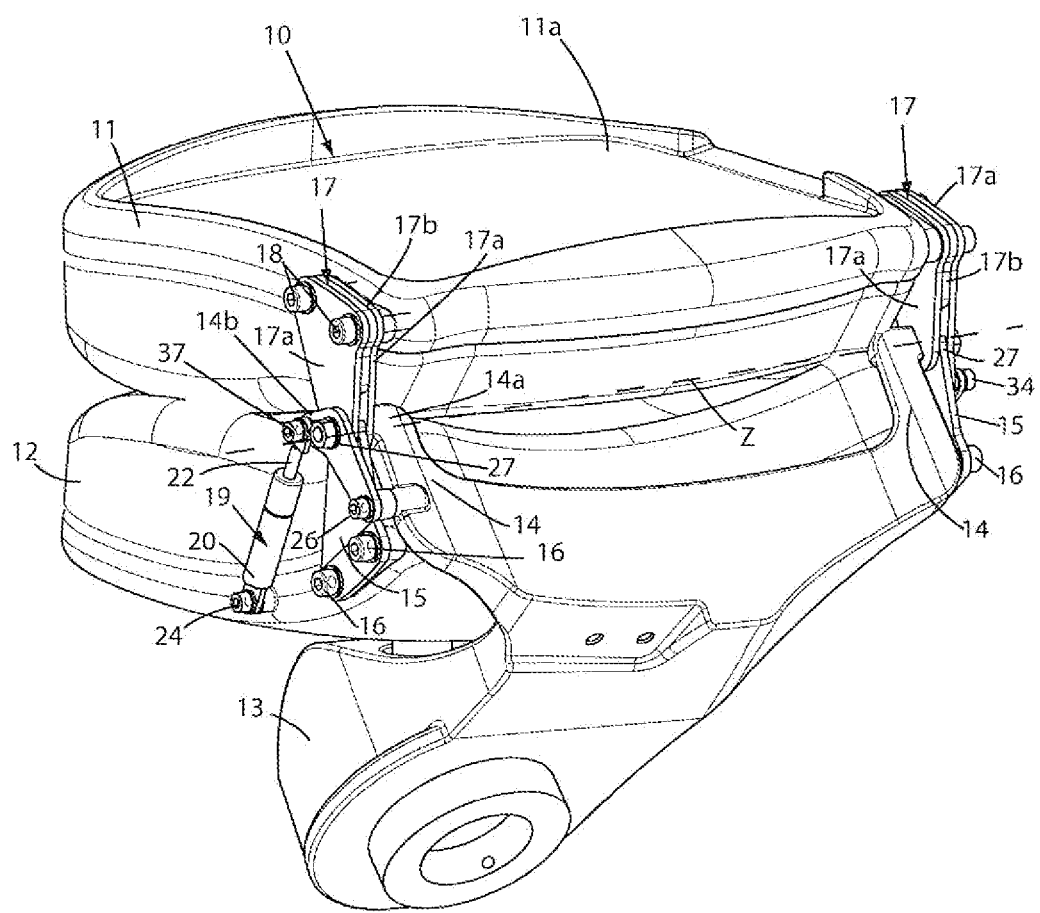
FIG. 2 shows a rear perspective view of the seat of FIG. 1 in its table position.
Figure 3:
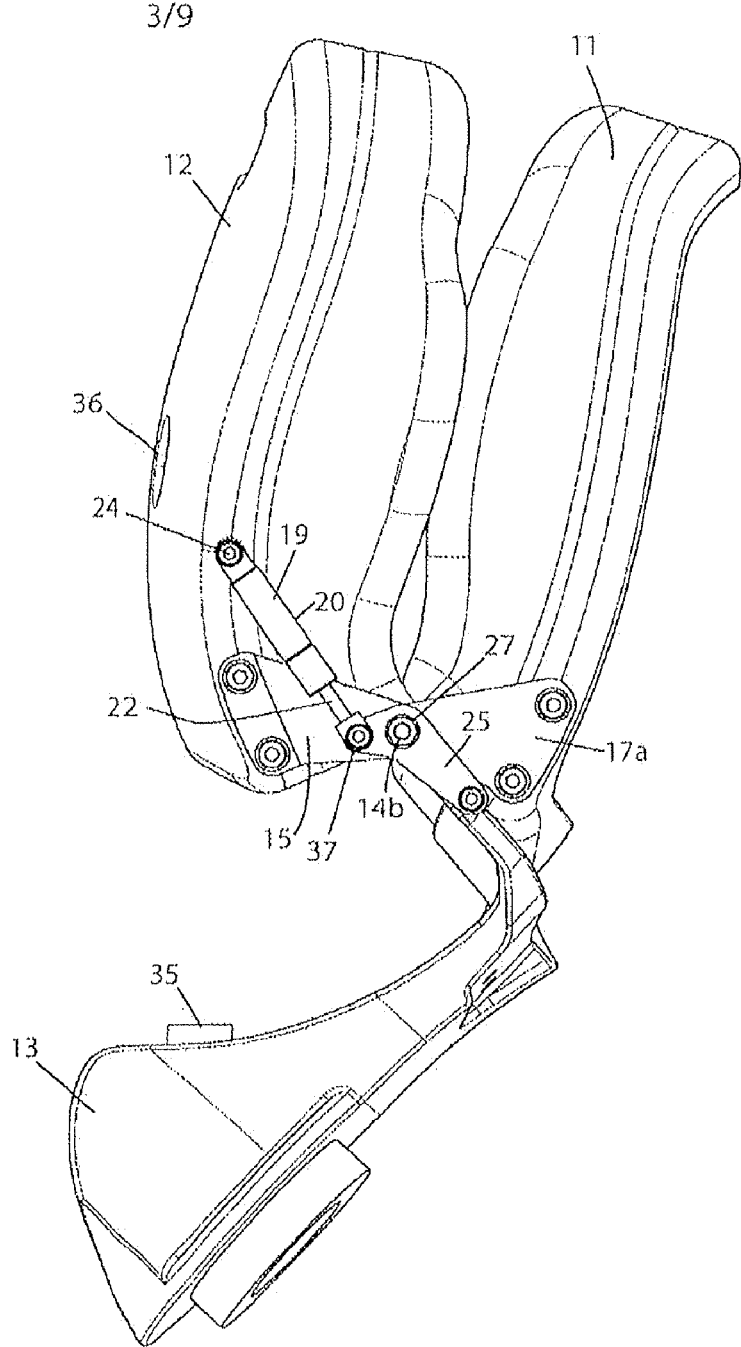
FIG. 3 shows a side view of the seat in its stored position.
Figure 7:
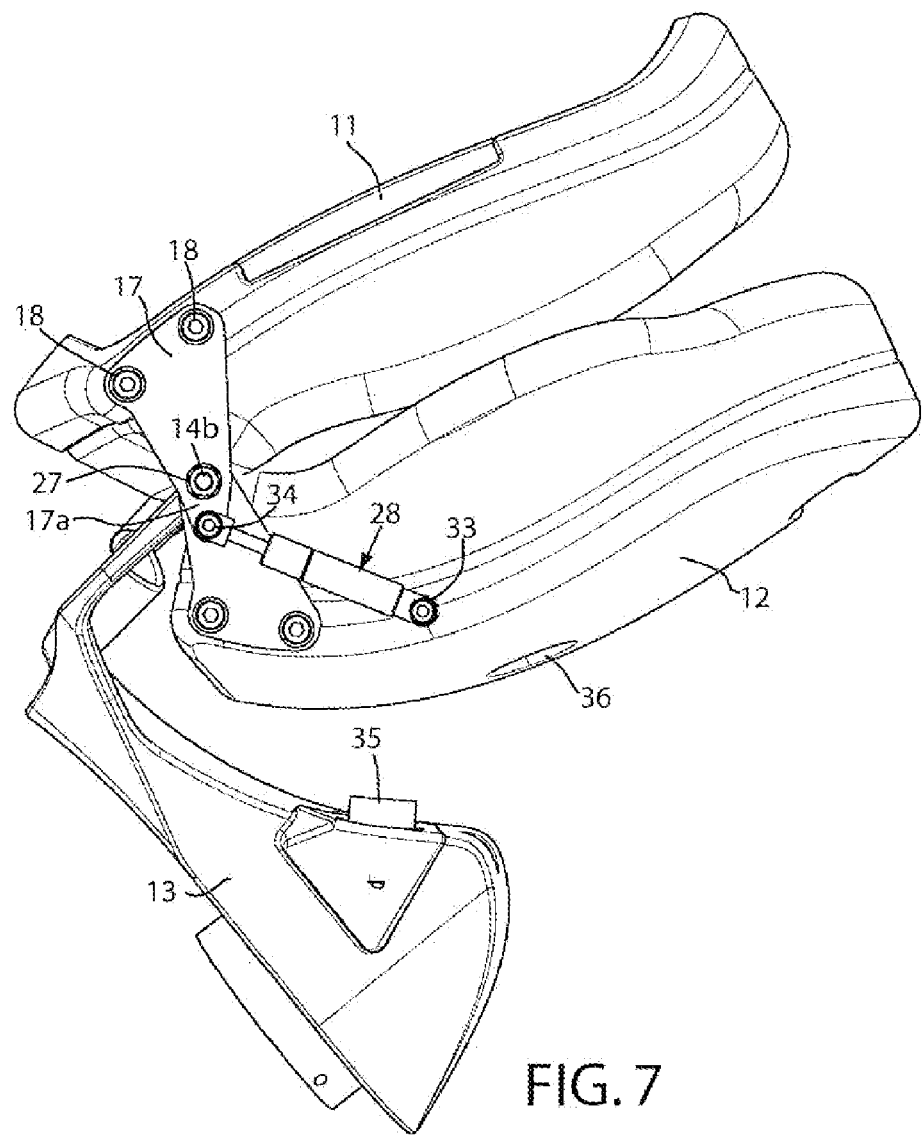
FIG. 7 shows a side view of the backrest and seat base moving together between their stored and table positions.
Figure 8:
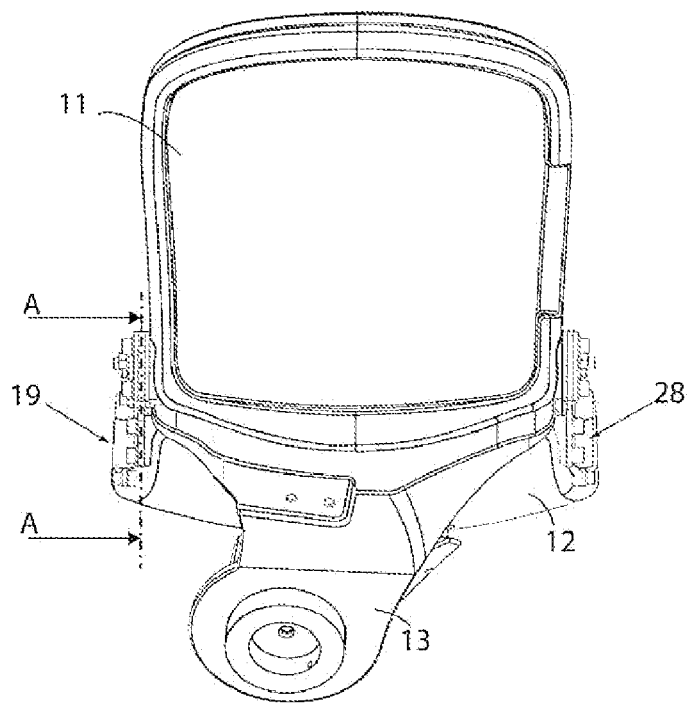
FIG. 8 shows a rear view of the seat.
Figure 9:
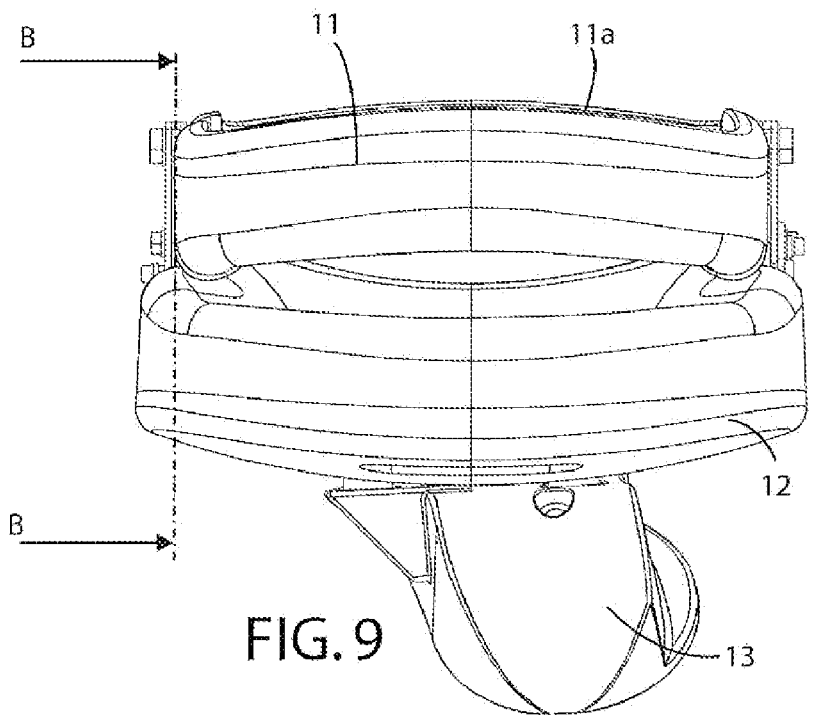
FIG. 9 shows a front view of the seat in its table position.
Figure 11:
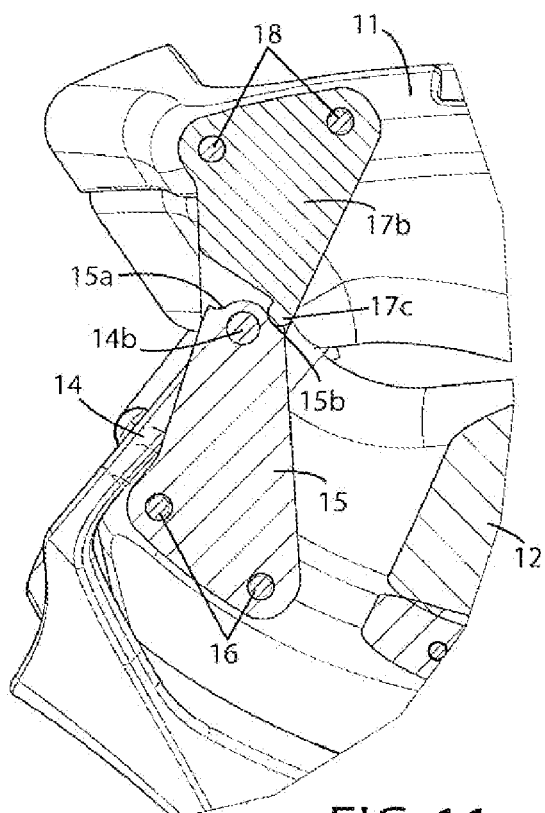

As can be seen from FIG. 7, the seat base 12 and backrest 11 can be pivoted together as a pair between a table position shown in FIGS. 2 and 4 (in which the back 11a of the backrest forms a table for use by the operator) and the stored position shown in FIG. 3. As the backrest and seat base pivot together between these positions pivotal movement is under the influence of the first gas strut 19 alone with the second gas strut 28 holding the backrest and seat base together with the stop nose 17c in contact with the stop surface 15b as shown in FIG. 11.

If the tractor operator wishes to move the backrest 11 upwardly from the table position in FIG. 4 to the seating position this movement is initially opposed by the second gas strut 28 and as the gas strut passes through its over-centre position the gas strut 28 begins to assist the operator to move the backrest to the fully vertical seating position when the stop nose 17c contacts the abutment surface 15a and the gas strut holds the backrest in the required seating position.

In the arrangement shown the spring installation is particularly compact as each spring 19,28 is located and moved inside the seat base and backrest contours as can be seen in the side views of FIGS. 3 to 7.

As will be appreciated, by providing the gas struts 19 and 28 the tractor operator is assisted in his movement of the backrest and seat base between their various desired positions and this movement of the backrest and seat base is also controlled so that these components cannot fall unexpectantly. The gas struts also prevent annoying rattle of the back rest and seat base when the tractor is in use and avoid the necessity for any mechanical locking devices for locking either the seat base or backrest in their various positions. Also one handed movement of the backrest and seat base is possible. The gas struts could be replaced by coil springs or other spring means which apply the same forces to the backrest and seat base.

By controlling the movement of the backrest towards the seat base using the stop nose 17c and the stop surface 15b damage and wear of the backrest and seat base is avoided since these two components are arranged not to contact each other with any significant pressure.

The present invention thus provides a folding seat which is particularly suitable for use in an agricultural tractor or similar vehicle which can be easily moved between and held in its various operating positions.

From reading the present disclosure, other modification will be apparent to persons skilled in the art. Such modifications may involve other features which are already known in the field of folding seats and component parts therefore and which may be used instead of or in addition to features already described herein.

The invention claimed is:

1. A folding seat having a support structure and a backrest and seat base pivotally mounted on the support structure for pivoting between a seating position with the seat base extending generally horizontal and the backrest generally vertically, a stored position with the seat base and the backrest both extending generally vertical, and a table position with the seat base and the backrest both extending generally horizontally, first over-centre spring means acting on the seat base to bias the seat base towards its generally horizontal position or its generally vertical position depending on which side of the first spring means over-centre position the base is located, and second over-centre spring means acting on the backrest to bias the backrest towards its generally vertical position or its generally horizontal position depending on which side of the second spring means over-centre position the backrest is located.

2. A seat according to claim 1 in which the first over-centre spring means acts between the seat base and the support structure and the second over-centre spring means acts between the seat base and the backrest.

3. A seat according to claim 2 in which the seat base is provided with a first pair of mounting brackets located one at each side of the seat base which pivotally mount the seat base on the support structure and the backrest has a second pair of mounting brackets located one on each side of the backrest which pivotally mount the back rest on the support structure and in which the second over-centre spring means acts between one of the second pair of brackets and the seat base.

4. A seat according to claim 1 in which the first over-centre spring means comprises a gas spring or a coil or compression spring.

5. A seat according to claim 1 in which first stop means are provided to limit the movements of the seat base and backrest away from each other to define the position of the backrest when in the seating position.

6. A seat according to claim 1 in which second stop means are provided to limit the movement of the seat base and backrest towards each other.

7. A seat according to claim 1 in which the seat base is provided with a first pair of mounting brackets located one at each side of the seat base which pivotally mount the seat base on the support structure and the backrest has a second pair of mounting brackets located one on each side of the backrest which pivotally mount the back rest on the support structure.

8. A seat according to claim 1 in which the first over-centre spring means acts between the seat base and the support structure and the second over-centre spring means acts between the seat base and the support structure.

* * * * *